Jan. 31, 1967 C. M. MOORE 3,301,193
ALTERNATING PISTON ENGINE
Filed Jan. 28, 1965 6 Sheets-Sheet 3

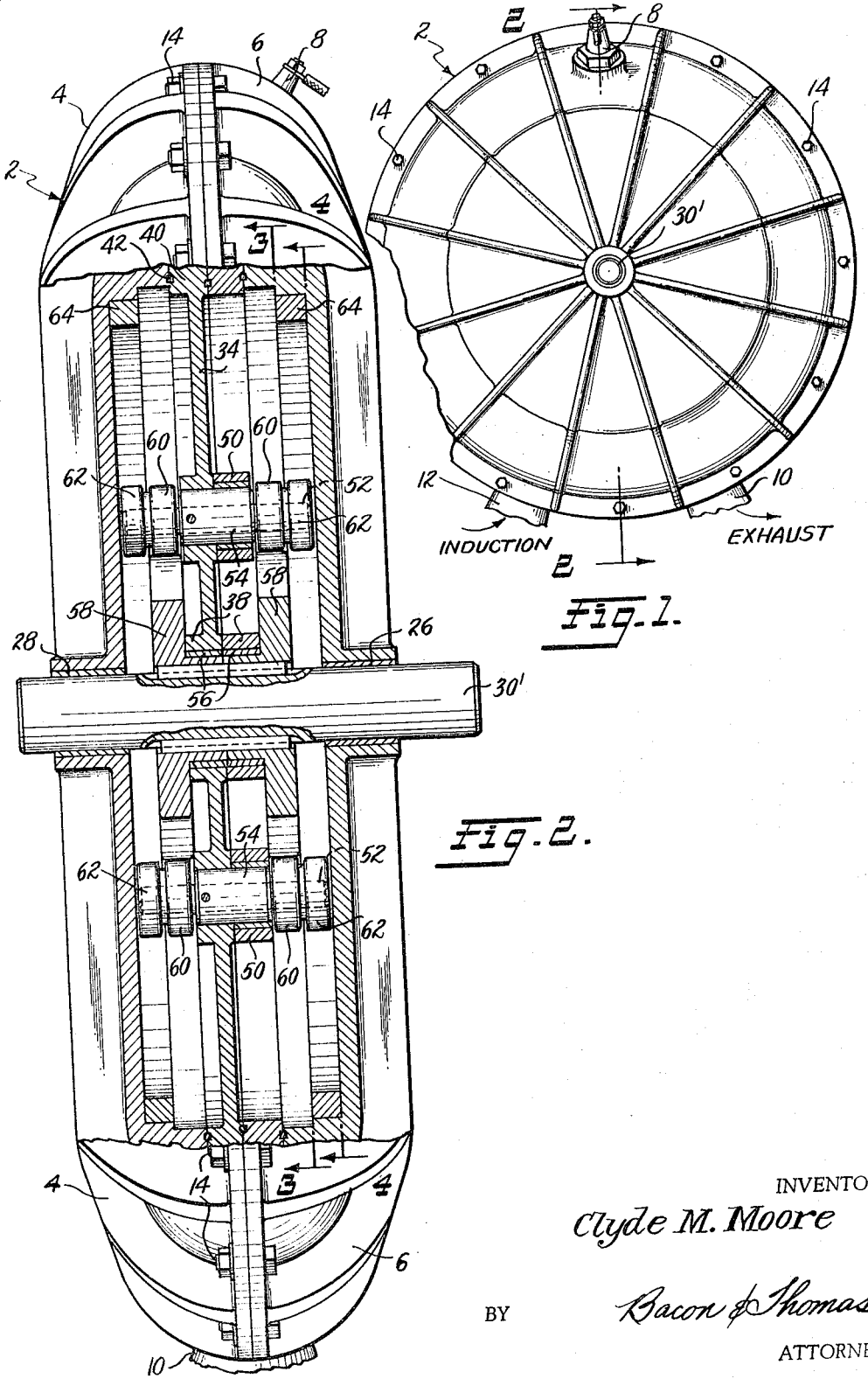

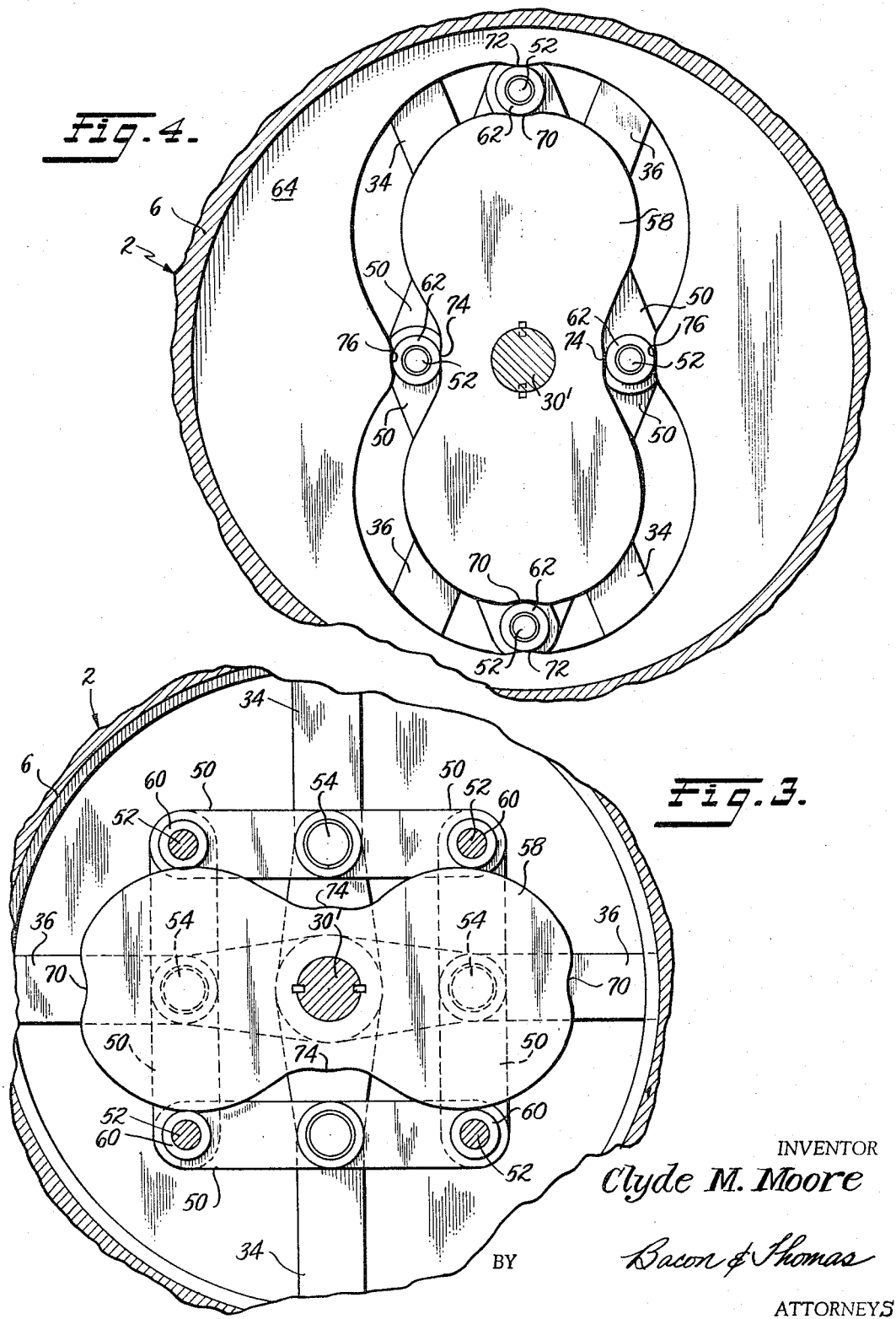

INVENTOR
Clyde M. Moore
BY Bacon & Thomas
ATTORNEYS

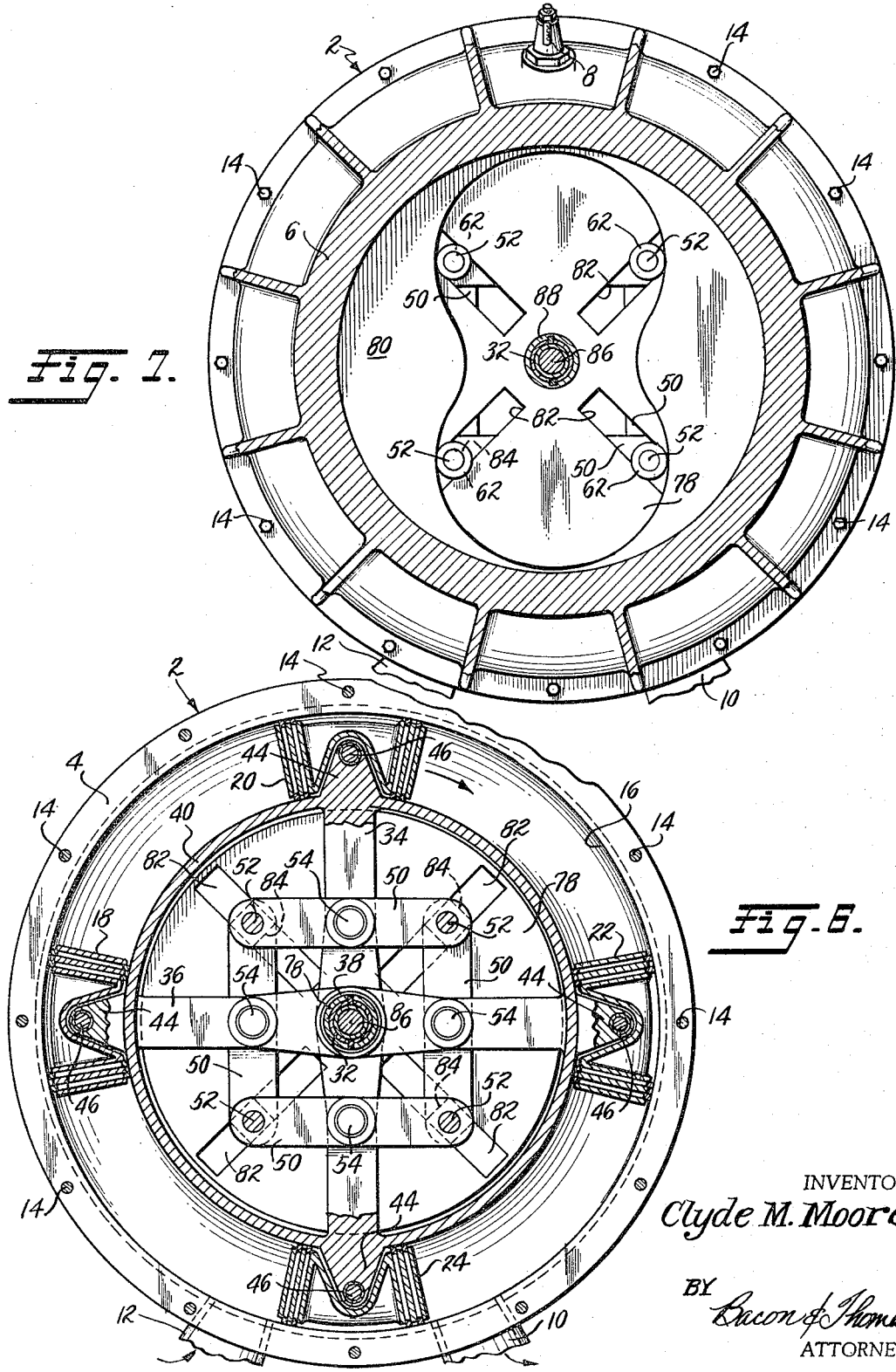

INVENTOR
Clyde M. Moore
BY Bacon & Thomas
ATTORNEYS

Jan. 31, 1967  C. M. MOORE  3,301,193
ALTERNATING PISTON ENGINE
Filed Jan. 28, 1965  6 Sheets-Sheet 6

INVENTOR
Clyde M. Moore
BY
Bacon & Thomas
ATTORNEYS

United States Patent Office 3,301,193
Patented Jan. 31, 1967

3,301,193
ALTERNATING PISTON ENGINE
Clyde M. Moore, Richmond, Va., assignor to Moorex Industries, Inc., Richmond, Va., a corporation of Virginia
Filed Jan. 28, 1965, Ser. No. 428,758
13 Claims. (Cl. 103—129)

This invention is an improvement on the invention shown and described in my Patent No. 3,034,449, issued on May 15, 1962.

This invention relates to alternating piston type engines, and more specifically to an engine of the alternating piston type employing one or more pairs of pistons operating in an annular chamber, the pistons having variable speeds whereby one piston functions on the movable member and the other as an abutment to provide a variable volume expansion or compression chamber during one portion of a cycle, and the other piston functions as a movable member and the one piston functions as the abutment during another portion of the cycle. Engines of this type are referred to in the art as "alternating piston type" because of the operation wherein any one piston alternately functions as an abutment and as the working member in an expansible chamber. The word "engine" is used herein in its broader sense to include pumps, compressors, expansible chamber motors operated by compressed gas or a liquid under pressure, meters, and combustion engines of the internal or external combustion type.

Engines of this type depend upon various forms of mechanical transmission or translate the alternating variable speeds of the pairs of pistons to a constant speed power output shaft in a combustion engine or fluid operated motor, or to translate the constant speed of a power input shaft to an alternating variable speed of the pistons in the case of a pump or compressor. Various forms of transmissions have been suggested, which suffer from one or more disadvantages, and as a result, this type of engine, which appears to lend itself so admirably to a pump, compressor, fluid pressure expansion motor, internal combustion engine or external combustion engine, has failed to attain any measure of success. Prior art transmissions fall into one of the following categories: (1) cams, internal or external, or combined; (2) cranks, and (3) intermittent grip devices. The cams and intermittent grip devices are subject to jerking movement of the parts, which produces objectionable vibrations and unbalanced forces, while the cranks fail to provide a satisfactory alternating movement which requires that the abutment piston remain practically stationary or to rotate very slowly in the same direction as the working piston.

The present application is directed to improvements in the engine of Patent No. 3,034,449, such improvements residing in the means for drivingly connecting a linkage mechanism associated with the pistons to a central or power shaft of the engine. In the patent referred to there is provided a fixed internal gear and an external gear keyed to the power shaft, both having teeth extending continuously throughout their peripheries. Both the fixed and external gears are shown as being of generally figure 8-shaped to enforce the proper relative movements between the pistons, all as described therein. It has been found, however, that the continuous gears meshing with the planetary gears journalled on the linkage mechanism has disadvantages since power is transmitted to or from the external gear solely by pressure on the sides of the teeth on the planetary gears and in many instances that pressure may be sufficient to break the teeth, or the forces applied at the axis of the planetary gears is directed in such direction that it tends to cause the gears to jam.

The present invention seeks to avoid the above difficulties in several different ways, each of which will be described in greater detail. In general, however, the improved engine is provided with fixed guiding means somewhat similar to the internal gear of the patent and planetary followers engaging said guiding means, said followers also engaging a member on the power shaft for driving connection thereto. The improvements consist generally in the provision of design features whereby the follower means engage a member on the power shaft in positive driving relation thereto at at least certain spaced positions during each engine cycle, all as will be more fully described later.

It is, therefore, an object of this invention to provide an engine of the type described wherein means are provided to establish a positive drive to a power shaft at at least predetermined spaced portions of the engine cycle.

A further object is to provide an engine as set forth above of much more simplified construction and high efficiency of operation.

Further and additional objects and advantages will become apparent to those skilled in the art as the description proceeds with reference to the accompanying drawings wherein:

FIG. 1 is a side elevational view of the exterior of an engine embodying the present invention;

FIG. 2 is an enlarged vertical sectional view taken substantially along the line 2—2 of FIG. 1 but with certain parts shown in elevation;

Figure 5:
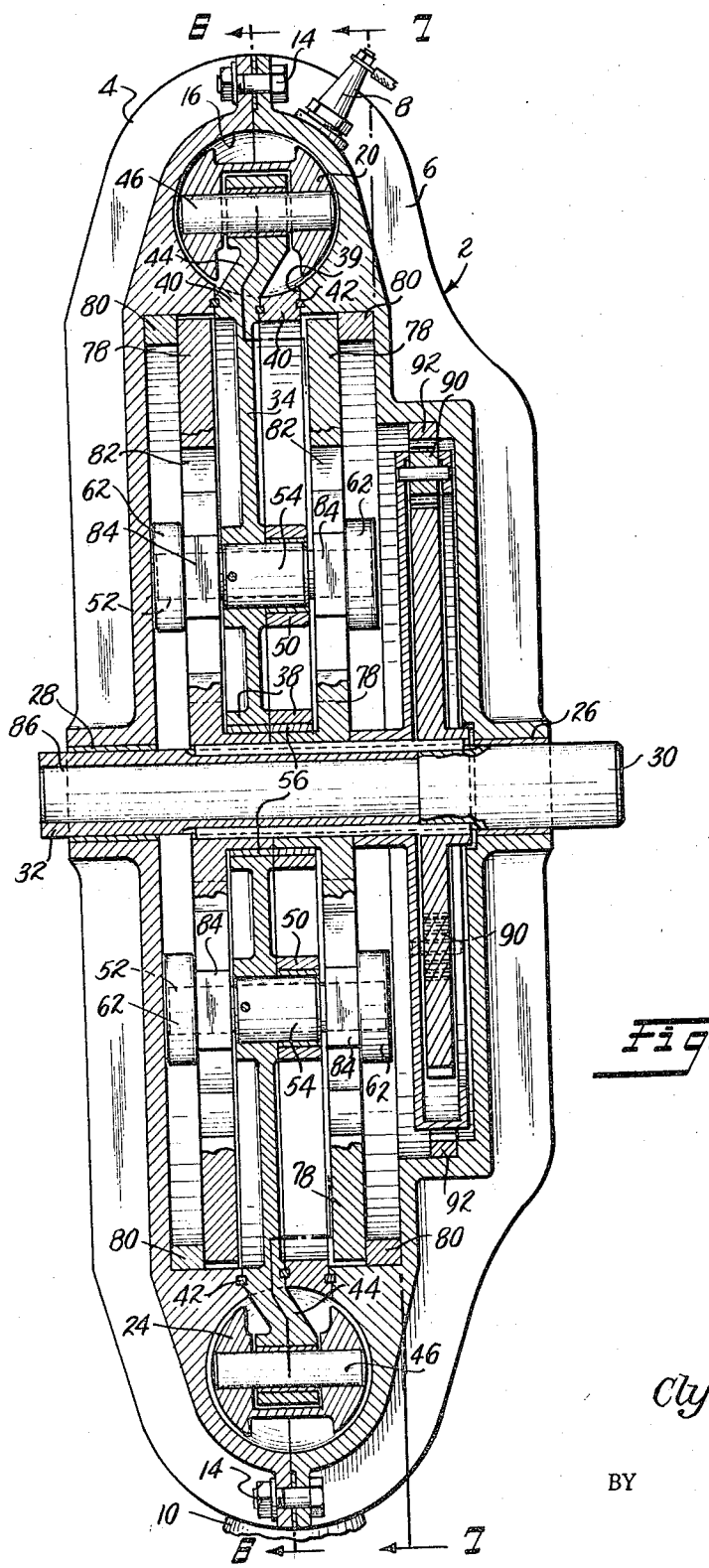
Figure 8:
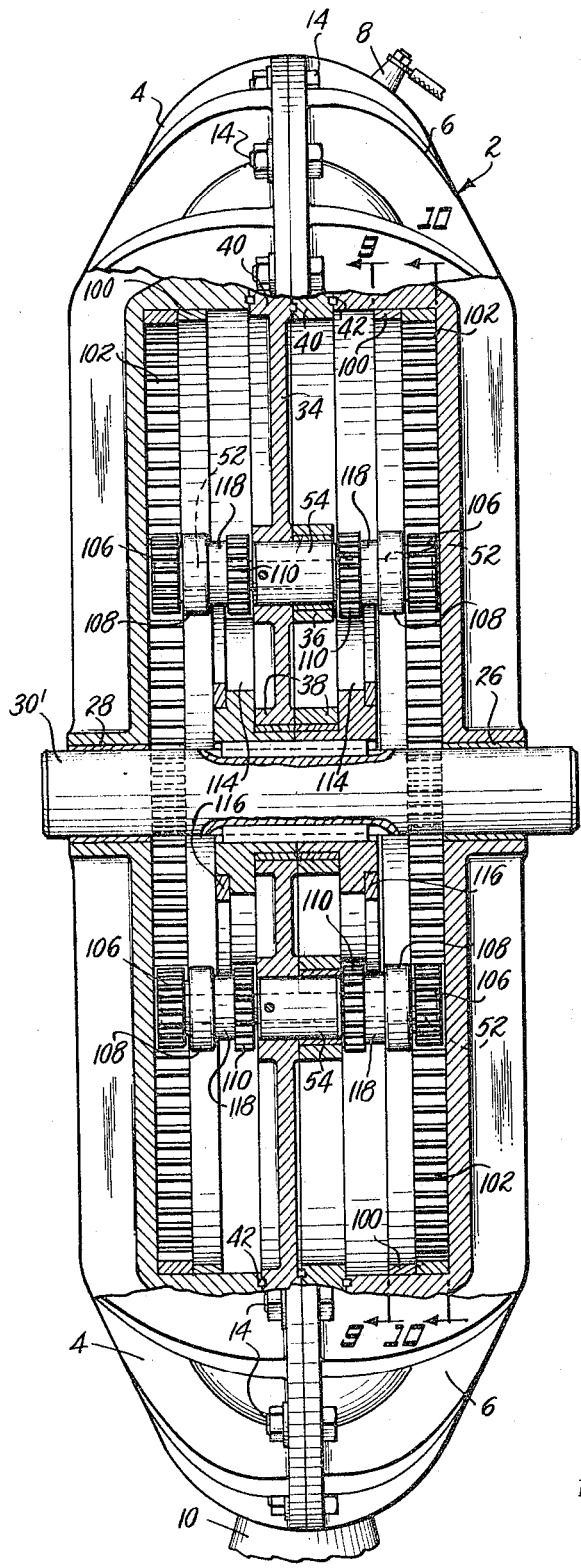

FIG. 3 and 4 are vertical sectional views taken respectively along the lines 3—3 and 4—4 of FIG. 2 but with the parts shown in different relative positions in the two figures;

FIG. 5 is a vertical sectional view, similar to FIG. 2 but showing another embodiment of the invention;

FIGS. 6 and 7 are fragmentary sectional views taken respectively along the lines 6—6 and 7—7 of FIG. 5;

FIG. 8 is a vertical sectional view similar to FIG. 2 but showing a different embodiment of the improved engine; and FIGS. 9 and 10 are fragmentary sectional views taken respectively along the lines 9—9 and 10—10 of FIG. 8.

The drawings herein illustrate an internal combustion engine, only for convenience of description. It is to be understood that the invention is applicable to other types of engines and/or pumps or compressors or the like.

Throughout the figures many parts are considered to be substantially identical in the various modifications and are identified by the same reference numerals.

Reference is made to the aforesaid Patent No. 3,034,449 for a more complete description of the cycling and basic mode of operation of the engine although a brief over-all description will be presented herein before making a detailed description of the improvements comprising the present invention.

FIG. 1 merely shows an axial end view of the exterior of an engine embodying this invention and is considered to be illustrative of all embodiments. An outer casing 2 comprises two similar portions 4 and 6 (FIG. 2) enclosing the mechanism to be described hereafter. Since the illustrative embodiment is an internal combustion engine a spark plug 8 or equivalent ignition device is shown at a position corresponding to the "dead center" position of the pistons. Numeral 10 indicates an exhaust port from which the spent products of combustion are discharged and numeral 12 indicates an induction or intake port through which a fuel and air mixture is drawn, all as described in the aforesaid patent.

Referring now particularly to FIGS. 5 and 6, the casing portions 4 and 6 are joined at the peripheries by bolts 14 or the like and are configured internally to define an annular cylinder chamber 16. The chamber 16 is in fact a torus and two pairs of pistons 18, 20, 22 and 24 are slidable therein. The casing 2 also defines a central chamber radially inwardly of the cylinder 16 and which contains the mechanism to be described and the casing also provides bearings 26 and 28 for a power shaft 30 which extends through the casing. In the particular embodiment of FIG. 5 the shaft 30 does not in fact extend through the casing as a single unit but is aligned with a secondary shaft 32, journalled thereon in a manner to be more fully described later.

The pistons 18–24 are arranged in diametrical pairs, each pair being connected and held in diametrically opposed relationship by rigid arms 34 and 36. Each of the arms 34 and 36 is provided with a central hub 38 by which they are respectively journalled on a further hub structure. The annular cylinder chamber 16 is provided with a continuous inner opening 39 (see FIG. 5) providing communication with the central chamber of the housing 2. A pair of rings 40 are respectively integral with the arms 34 and 36 and complement each other to close the opening 39 and to define the inner peripheral surface of the cylinder chamber 16. Suitable seals 42 are contemplated. Each of the rings and its associated arm is provided with outwardly directed lugs 44 at diametrically opposed positions, which lugs are pivotally connected to their associated pistons by means of wrist pins 46. Referring now to FIG. 6, an articulated parallelogram linkage is formed of equal-length links 50. The parallelogram formed by the links 50 is articulated since the ends of the links are pivotally connected, at the corners of the parallelogram, by suitable pivot means 52. Opposed links 50 are pivotally joined, at their midpoints, to one of the arms 34 or 36 and the other opposed pair of links 50 are pivotally joined, intermediate their ends, to the other of the arms 34–36, such pivotal connections being indicated at 54. It will be apparent that distortion of the parallelogram to a diamond shape will result in causing the arms 34 and 36 to rotate relative to each other to decrease the space between adjacent pistons on one side and to increase the space between them on the other side thereof. All of the aforesaid basic structural features are fully described in the prior patent referred to and, as that patent further discloses, guide means are provided in stationary relation to the casing to control the degree and extent of distortion of the parallelogram as the assembly of pistons rotate in one direction about the shaft 30. In general the guiding means comprises a member of generally figure-8 configuration that engages follower means at the four corners of the described parallelogram. The power shaft is also provided with a generally figure-8-shaped member fixed thereto and also engaged by the follower means at the corners of the parallelogram so that rotation of the pistons, arms 34–36, and the parallelogram in one direction will enforce related rotation of the power shaft by virtue of the driving engagement between the follower means and the member fixed on the power shaft. Reference is made to FIGS. 5 through 10 of the prior patent for a graphic showing of the sequences involved in a cycle of operation and the same will not be described in further detail here.

Referring now to FIGS. 2 to 4, showing one embodiment of the improved invention, the shaft 30' is a single shaft extending completely through the casing 2. The arms 34 and 36 are journalled on hubs 56 (the further hub structure previously referred to) of cam-like members 58, keyed to the shaft 30' to enforce unitary rotation therewith. The pivot means 52, previously described as defining the corners of the parallelogram structure are shown as extending axially beyond the linkage described and each is provided at each of its opposite ends with independently journalled pairs of rollers 60 and 62.

Rigidly fixed to the casing members 4 and 6 are internal cams 64 having internal cam surfaces of generally figure-8 configuration, as more clearly shown in FIG. 4. The rollers 62 roll along that internal cam surface whereas the rollers 60 engage the outer periphery of the cam-like members 58, as also indicated in FIGS. 3 and 4. From the principles of operation described in the patent referred to, it will be obvious to those skilled in the art how the engine operates. In all the modifications described herein the fixed guide means, the followers, and the means connected to the power shaft are shown in duplicate on opposite sides of the central plane of the engine. This is for the purpose of balancing forces transmitted through the parts to further increase the efficiency of the apparatus. In any event, the mechanisms are substantially duplicated on opposite sides of the central plane and hereafter where detailed description is made of only those elements on one side thereof, it will be understood that similar structures are present on the other side.

Referring now particularly to FIGS. 3 and 4, the follower rollers shown in FIG. 4 are the rollers 62 engaging the internal cam 64 and the follower rollers shown in FIG. 3 are the rollers 60 engaging the periphery of the member 58, it being understood that the two sections are taken in adjacent but axially displaced planes. When the parts are in the position shown in FIG. 3, it is obvious that translational movement of the rollers 60, links 50 and arms 34 and 36 in a clockwise direction, for example, about the axis of shaft 30' will occur with all four rollers moving as a unit at the instant shown. Since those rollers engage the member 58 at such points that the actual direction of motion of each roller 60 has a substantial component tangent to the shaft 30' and the forces applied perpendicular to their surfaces at the points of contact with member 58 cause the latter to rotate in the same direction without slippage or binding. However, when the parts are in the positions shown in FIG. 4, clockwise translational movement of the rollers is in such direction that they tend to move generally parallel to the engaged surface of the member 58 (at that instant) and thus power transmission from the pistons to the shaft or vice versa is questionable and the parts will tend to bind. The present invention is directed to features designed to overcome this difficulty. As shown in FIGS. 3 and 4, the member 58 is of the generally figure-8 shape constituting a basic feature of the engine and is in the form of an external cam. However, the end portions of the cam are provided with slight depressions 70 into which the rollers 60 will move when they reach the ends of the cam. Since the rollers 60 move radially inward of cam 58 a slight amount when they enter the depressions 70, the internal cam 64 is likewise provided with projections 72 opposite the depressions 70 so as to maintain constant contact with the followers of which rollers 62 are a part. As the end rollers 60 move into the depressions 70, this has the effect of further distorting the parallelogram comprising links 50 and causes the intermediate corners thereof to move outwardly. To compensate for this effect the narrow or waist portion of the member 58 is provided with slight projections 74 and the internal cam 64 is provided with corresponding slight depressions 76. With the parts in the position shown in FIG. 4, alternate rollers 60 being seated in the depressions 70, rotation of the parallelogram and the follower rollers in a clockwise direction, for example, will impart substantially positive drive to the member 58 and shaft 30' since the actual point of contact between the rollers 60 and the cam 58 is at such angle that the force transmitted is in a direction having a substantial component tangent to the axis of shaft 30' rather than being directly radial thereto. The effect at this point might be described as being similar to a single gear tooth on each member 58 and 60 meshing only at these portions of the cycle. The depth of the depressions 70 need not be very great and in fact should be quite shallow. Even shallow depressions, however, have been found to produce satisfactory results.

Referring now to FIGS. 5 to 7, illustrating a second embodiment of the improved engine, parts bearing similar reference numerals are identical to corresponding parts described in connection with FIGS. 2–4. The slotted plates 78, which replace the cam members 58 of FIG. 2, are keyed to the shaft portion 32 previously described and are of different configuration from the cams 58, to be described later. Fixed internal cams 80 of generally figure-8 configuration are carried by the housing 2 but are of the smooth internal shape shown in FIG. 7, without depressions or projections corresponding to 72 or 76 of FIG. 4. Rollers 62, carried by the pivots at the corners of the parallelogram engage and roll along the inner surface of the internal cam 80, as already described and control the distortion of the parallelogram linkage. The slotted plates 78, however, are not of the figure-8 configuration but are circular discs keyed to the shaft 32 and each is provided with diametrical pairs of radial slots 82 (see FIGS. 6 and 7). The pivot means 52 extend through those slots and carry the rollers 62 journalled at their outer ends. The portions of the pivot means 52 extending through the slots 82 are journalled in slide elements 84 slidably engaging the side walls of the slots 82 for guided radial sliding movement therein.

It will be obvious to those skilled in the art that as the pistons and their related arms and the parallelogram rotate, for example clockwise as seen in FIGS. 6 and 7, the slides 84 will be enforced to rotate therewith and will positively engage the discs 78 at circumferentially spaced points in positive driving relation so that rotation of the piston assembly will enforce positive corresponding rotation of the discs 78 and shaft 32. It will also be apparent that the radial extent of the slots 82 permits the parallelogram to be distorted from square to diamond shape without binding of any of the parts.

Referring now specifically to FIG. 5, there is shown therein a feature that could, if desired, be incorporated in any of the other modifications. The shaft 32 comprising the power shaft of the engine is in the form of a sleeve journalled on a pilot portion 86 of shaft 30 and has keyed thereto a carrier member 88 on which three planetary pinions 90 are journalled. The planetary pinions 90 mesh with a fixed ring or orbit gear 92 carried by the casing 2 and they also mesh at their inner extremities with a sun or output gear 94 keyed to the shaft 30. Thus, the shaft 30 may be employed as the output shaft of an engine and is caused to rotate at substantially twice the speed of the shaft 32. On the other hand the shaft 30 may be employed as an input shaft driven by a highspeed motor or the like to effect relatively low speed driving of the pistons when used as a compressor or pump.

A third embodiment of the improved engine is shown in FIGS. 8 to 10. In this embodiment all elements similar to those previously described bear the same reference numerals and their description will not be repeated. In this form of the improvement, the casing 2 fixedly holds stationary guide means comprising an internal cam 100 of figure-8 configuration and adjacent thereto is a fixed internal gear 102 of the same shape.

In many instances, it will be preferred to have the internal periphery of the cam 100 of such dimensions as to lie substantially along the pitch line of the gears on the internal edge of the gear 102. The pivot means 52 at the corners of the parallelogram support a follower pinion gear 106 keyed or otherwise fixed to its outer end. Adjacent the gear 106 a roller 108, corresponding to the rollers 62 of FIG. 4, is freely journalled on the shaft 52. Axially inwardly of the roller 108 is a second pinion gear 110, also keyed to the shaft 52 and which meshes with partial external gear teeth 112 on portions of the outer periphery of members 114, of figure-8 shape, keyed to the shaft 30'. The axially outer faces of the members 114 fixedly support plate cams 116 in fixed relation thereto so that the cams and members 114 rotate as a unit with shaft 30'. Between the roller 108 and the second pinion gear 110 a further roller 118 is journalled on the shaft 52 in position to engage the periphery of the plate cam 116.

As is shown in FIGS. 9 and 10, the major portion of the outer periphery of the members 114 is smooth and untoothed, only the end portions thereof being provided with the gear teeth 112 and they extend throughout a circumferential arc that subtends an angle of about 30°, measured from the axis of the shaft 30'. The angle shown, however, is merely illustrative and could be as much as 45° or more as long as there is a substantial gap between adjacent ends of the groups of teeth. The external cam plates 116 are provided with smooth peripheries throughout their circumference and in many instances it will be preferred that the actual periphery of the cams 116 define the pitch line of the gears 112, although such relationship is not essential. While the groups of teeth 112 are shown at the ends of the members 114, they could instead be at the waist or narrow portion of the member.

The stationary orbit gear 102 and the stationary internal cam 100 together constitute a fixed guide means enforcing predetermined distortions of the parallelogram as the assembly rotates. The rollers 104 and the smooth surface of the cam 100 provide precise radial control and prevent jamming of the teeth between the pinions 106 and the internal gear 102. The latter relationship, however, controls rotation of the shaft 52 and thereby controls rotation of the pinion 110 so that the same is in the proper angular orientation to move smoothly into mesh with the gear teeth 112 as each follower assembly approaches the ends of the figure-8 shaped cams 116 rotating with the shaft 30'. It will be apparent that, with the parts shown in the relative positions illustrated in FIG. 10, the assembly comprising pinion 110, shaft 52 and pinion 106 is in effect a single planetary pinion meshing with internal and external gears 112 and 102. Thus, movement of the shaft 52 to the right, as it follows rotary movements of the piston and parallelogram assembly, will ensure positive rotational drive to the output shaft 30', and at the same time the smooth surfaces of cams 100 and 116 and their associated rollers control the radial position of the shaft 52 so that the pinions thereon will not jam into and bind against the teeth 112 or the teeth of gear 102. When the parts are in such relative position that the gears 110 no longer mesh with the teeth 112, for example as shown in FIG. 9, the smooth cams 100 and 116 and the rollers 104 and 118 serve to establish the driving relationship, as described in connection with FIG. 3, with a minimum of friction and without relying on the transmission of forces through gear teeth.

While the drawings and description herein show and refer to the spaced groups of gear teeth as being on rotary member 114 and the continuous teeth as being on the fixed member 102, that is not critical. Obviously the same results could be obtained if the teeth on 114 were continuous and the member 102 were provided with the spaced groups of teeth.

While a limited number of specific embodiments of the invention have been shown and described herein, it is to be understood that the same are merely illustrative of the principles involved and that other forms may be resorted to within the scope of the appended claims.

I claim:

1. An alternating piston type engine, comprising: a housing having an annular chamber therein having inlet and outlet ports; a plurality of pistons in said chamber; connecting means interconnecting pairs of said pistons for simultaneous rotary movement in said chamber; a power shaft; and transmission means for translating non-uniform movement of said interconnected pairs of pistons to uniform rotation of said power shaft and vice versa, said transmission means comprising articulated link means pivotally joined to said connecting means to control movements thereof whereby when said pistons rotate in the same direction one interconnected pair may accelerate while another pair is decelerating, and vice versa, to alternately contract and expand the space between successive pistons; fixed non-circular guide means carried by said housing, a plurality of follower means carried by said articulated link means and engaging said guide means; and a member fixed on said power shaft, said follower means drivingly engaging said member; said member having circumferentially spaced means engageable with said follower means to establish substantially positive drive relationship therebetween only at the positions of said circumferentially spaced means.

2. An engine as defined in claim 1 wherein said fixed guide means is in the form of an internal cam; said member having a periphery defining an external cam of generally the same shape as said internal cam; said follower means comprising rollers journalled on said articulated link means; the circumferentially spaced means on the periphery of said external cam means comprising spaced depressions therein engageable by said rollers to establish substantially positive drive therebetween during periods when said rollers engage in said depressions.

3. An engine as defined in claim 2 wherein said articulated link means comprises four pivotally joined links defining an articulated parallelogram; said rollers being journalled thereon at the pivot joints between links; said connecting means being pivoted to said links intermediate the ends thereof; the periphery of said external cam being provided with protuberances, intermediate said depressions whereby all said rollers are maintained in constant contact therewith.

4. An engine as defined in claim 2 wherein said internal and external cams are of generally figure-8 shape, said depressions being at the ends of said external cams.

5. An engine as defined in claim 3 wherein said internal cam is provided with protuberances and depressions opposite said depressions and protuberances, respectively, of said external cam.

6. An engine as defined in claim 1 wherein said fixed guide means is in the form of an internal cam; said member comprising a disc fixed to said power shaft, and said circumferentially spaced means being radial slots in said disc, said follower means slidably engaging in said slots.

7. An engine as defined in claim 6 wherein said articulated link means comprises pivotally joined links defining an articulated parallelogram; said follower means comprising rollers pivoted thereon at the pivot joints between links and slide elements also pivoted thereon at said pivot joints, said rollers engaging said internal cam and said slide elements being guided for radial sliding movement in said slots.

8. An engine as defined in claim 1 wherein said fixed guide means comprises an internal cam and an internal gear adjacent and parallel thereto, said internal gear being toothed throughout its periphery; said member comprising an external cam and a partially toothed gear adjacent and parallel thereto, said partially toothed gear having circumferentially spaced groups of gear teeth thereon comprising said circumferentially spaced means; said follower means being journalled on said articulated link means and each comprising a pair of coaxial pinion gears fixed together for unitary rotation, one meshing with said internal gear, and the other sequentially meshing with said spaced groups of gear teeth; and a pair of independently journalled rollers coaxial to said gears and respectively engaging said internal and external cams.

9. An engine as defined in claim 8 wherein the cam surfaces of said cams are substantially coaxial with the pitch lines of their respectively associated gear teeth.

10. An engine as defined in claim 8 wherein said fixed guide means and said member are of generally figure-8 shape, said circumferentially spaced groups of gear teeth on said member being positioned at the opposite ends thereof.

11. An engine as defined in claim 10 wherein each of said circumferentially spaced groups of gear teeth extend throughout an arc subtending of from about 30° to about 45°, measured at the axis of said power shaft.

12. An alternating piston type engine, comprising: a housing having an annular chamber therein having inlet and outlet ports; a plurality of pistons in said chamber; connecting means interconnecting pairs of said pistons for simultaneous rotary movement in said chamber; a power shaft; and transmission means for translating non-uniform movement of said interconnected pairs of pistons to uniform rotation of said power shaft and vice versa, said transmission means comprising articulated link means pivotally joined to said connecting means to control movements thereof whereby when said pistons rotate in the same direction one interconnected pair may accelerate while another pair is decelerating, and vice versa, to alternately contract and expand the space between successive pistons; fixed non-circular guide means carried by said housing and including a gear having internal teeth, a plurality of follower means carried by said articulated link means engaging said guide means and including a first pinion aligned with said internal teeth; and a member fixed on said power shaft and including a gear having external teeth, said follower means drivingly engaging said member and including a second pinion fixed to said first pinion and aligned with said external teeth; the teeth on one of said gears being continuous therearound and the teeth on the other gear being circumferentially spaced groups of teeth.

13. An engine as defined in claim 12 wherein said fixed guide means and said member on said power shaft further include a cam fixed adjacent each gear and said follower means further includes rollers thereon engaging said cams.

References Cited by the Examiner

UNITED STATES PATENTS

| | | | |
|---|---|---|---|
| 1,095,034 | 4/1914 | Sanchez et al. | 123—11 |
| 1,221,081 | 4/1917 | Neilson | 123—11 |
| 1,303,255 | 5/1919 | Carter | 123—11 |
| 1,330,629 | 2/1920 | Gooding | 91—60 |
| 1,695,888 | 12/1928 | Dowdey | 123—11 |
| 2,050,603 | 8/1936 | Gardner | 123—11 |
| 2,124,327 | 7/1938 | Wolstenholme | 123—11 |
| 2,147,290 | 2/1939 | Gardner | 123—11 |
| 2,222,133 | 11/1940 | Wolstenholme | 123—11 |
| 2,271,068 | 1/1942 | Gardner | 123—11 |
| 3,034,449 | 5/1962 | Moore | 103—129 |

FOREIGN PATENTS 51,874    12/1932    Norway.

MARK NEWMAN, *Primary Examiner.*

W. J. GOODLIN, *Assistant Examiner.*